US012584055B2

(12) United States Patent
Itano et al.

(10) Patent No.: US 12,584,055 B2
(45) Date of Patent: Mar. 24, 2026

(54) COMPOSITION INCLUDING REFRIGERANT, USE THEREOF, REFRIGERATOR HAVING SAME, AND METHOD FOR OPERATING SAID REFRIGERATOR

(71) Applicant: DAIKIN INDUSTRIES, LTD., Osaka (JP)

(72) Inventors: Mitsushi Itano, Osaka (JP); Tomoyuki Gotou, Osaka (JP); Takashi Yoshimura, Osaka (JP); Takashi Usui, Osaka (JP); Tatsumi Tsuchiya, Osaka (JP); Tsubasa Nakaue, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 600 days.

(21) Appl. No.: 18/079,383

(22) Filed: Dec. 12, 2022

(65) Prior Publication Data

US 2023/0110292 A1 Apr. 13, 2023

Related U.S. Application Data

(63) Continuation of application No. PCT/JP2022/036516, filed on Sep. 29, 2022.

(30) Foreign Application Priority Data

| Oct. 4, 2021 | (JP) | ................................. 2021-163683 |
| Jan. 28, 2022 | (WO) | .................. PCT/JP2022/003424 |
| May 18, 2022 | (JP) | ................................. 2022-081828 |

(51) Int. Cl.
*C09K 5/04* (2006.01)

(52) U.S. Cl.
CPC .................................. *C09K 5/045* (2013.01)

(58) Field of Classification Search
CPC ...................................................... C09K 5/045
See application file for complete search history.

(56) References Cited

U.S. PATENT DOCUMENTS 8,961,811 B2 2/2015 Minor et al.
11,535,781 B2 * 12/2022 Kumakura .............. F24F 13/30
(Continued)

FOREIGN PATENT DOCUMENTS

| JP | 2015-229767 | 12/2015 |
| WO | 2012/157765 | 11/2012 |
(Continued)

OTHER PUBLICATIONS

International Search Report issued Apr. 19, 2022 in International (PCT) Application No. PCT/JP2022/003424.
(Continued)

*Primary Examiner* — Peter F Godenschwager
(74) *Attorney, Agent, or Firm* — Wenderoth, Lind & Ponack, L.L.P.

(57) ABSTRACT

A novel low-GWP mixed refrigerant is provided. A composition comprising a refrigerant, the refrigerant comprising trans-1,2-difluoroethylene (HFO-1132(E)), difluoromethane (R32), and 2,3,3,3-tetrafluoropropene (HFO-1234yf), is provided, wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by straight lines C1D, DG, GH, HB', and B'C1 that connect the following 5 points: point C1 (52.0, 36.9, 11.1), point D (44.0, 0.0, 56.0), point G (12.2, 0.0, 87.8), point H (0.0, 8.2, 91.8), and point B' (0.0, 36.6, 63.4), or on the straight lines C1D and B'C1 (excluding points D and B').

10 Claims, 2 Drawing Sheets

(56) References Cited

U.S. PATENT DOCUMENTS

| | | | | |
|---|---|---|---|---|
| 11,549,041 | B2 * | 1/2023 | Itano | C09K 5/045 |
| 11,834,601 | B2 * | 12/2023 | Ohkubo | C10M 107/24 |
| 2014/0077123 | A1 | 3/2014 | Fukushima | |
| 2016/0333243 | A1 | 11/2016 | Fukushima et al. | |
| 2017/0002245 | A1 | 1/2017 | Fukushima | |
| 2017/0058172 | A1 | 3/2017 | Fukushima et al. | |
| 2017/0058173 | A1 | 3/2017 | Fukushima | |
| 2019/0031934 | A1 | 1/2019 | Fukushima et al. | |
| 2020/0317975 | A1 | 10/2020 | Itano et al. | |
| 2020/0385620 | A1 | 12/2020 | Itano et al. | |
| 2020/0385622 | A1 | 12/2020 | Itano et al. | |
| 2021/0071055 | A1 | 3/2021 | Itano et al. | |
| 2021/0080152 | A1 | 3/2021 | Itano et al. | |
| 2021/0309902 | A1 | 10/2021 | Kumakura et al. | |
| 2021/0340422 | A1 | 11/2021 | Ohkubo et al. | |
| 2021/0397850 | A1 | 12/2021 | Yakuwa | |
| 2022/0064509 | A1 | 3/2022 | Itano et al. | |
| 2022/0106513 | A1 | 4/2022 | Itano et al. | |
| 2022/0145155 | A1 | 5/2022 | Itano et al. | |
| 2022/0356386 | A1 | 11/2022 | Fujinaka et al. | |

FOREIGN PATENT DOCUMENTS

| | | |
|---|---|---|
| WO | 2015/115252 | 8/2015 |
| WO | 2015/141678 | 9/2015 |
| WO | 2015/186557 | 12/2015 |
| WO | 2015/186671 | 12/2015 |
| WO | 2019/123806 | 6/2019 |
| WO | 2019/123807 | 6/2019 |
| WO | 2019/123898 | 6/2019 |
| WO | 2019/124401 | 6/2019 |
| WO | 2019/124403 | 6/2019 |
| WO | 2020/017520 | 1/2020 |
| WO | 2020/017521 | 1/2020 |
| WO | 2020/158170 | 8/2020 |
| WO | 2020/213697 | 10/2020 |
| WO | 2020/255966 | 12/2020 |
| WO | 2020/256126 | 12/2020 |
| WO | 2020/262209 | 12/2020 |

OTHER PUBLICATIONS

International Preliminary Report on Patentability issued Jul. 31, 2023 in International (PCT) Application No. PCT/JP2022/003424.

English translation of International Search Report issued Nov. 15, 2022 in International (PCT) Application No. PCT/JP2022/036516.

International Preliminary Report on Patentability and Written Opinion issued Apr. 9, 2024 in corresponding International (PCT) Patent Application No. PCT/JP2022/036516.

International Search Report issued Nov. 15, 2022 in International (PCT) Application No. PCT/JP2022/036516.

Extended European Search Report issued Jan. 27, 2025 in corresponding European Patent Application No. 22746049.0.

Extended European Search Report issued Sep. 19, 2025 in European Patent Application No. 22817509.7.

* cited by examiner

COMPOSITION INCLUDING REFRIGERANT, USE THEREOF, REFRIGERATOR HAVING SAME, AND METHOD FOR OPERATING SAID REFRIGERATOR

TECHNICAL FIELD

The present disclosure relates to a composition comprising a refrigerant, use of the composition, a refrigerating machine having the composition, and a method for operating the refrigerating machine.

BACKGROUND ART

A working medium for thermal cycling that contains trifluoroethylene (HFO-1123) and 1,2-difluoroethylene (HFO-1132)has been proposed as a working medium for thermal cycling that can replace R410A (PTL 1).

CITATION LIST

Patent Literature

PTL 1: WO2015/141678

SUMMARY

A composition comprising a refrigerant for use in operating air-conditioning equipment for vehicles,
the refrigerant comprising trans-1,2-difluoroethylene (HFO-1132(E)), difluoromethane (R32), and 2,3,3,3-tetrafluoropropene (HFO-1234yf),
wherein
when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by straight lines C1D, DG, GH, HB', and B'C1 that connect the following 5 points:
point C1 (52.0, 36.9, 11.1),
point D (44.0, 0.0, 56.0),
point G (12.2, 0.0, 87.8),
point H (0.0, 8.2, 91.8), and
point B' (0.0, 36.6, 63.4), or
on the above straight lines C1D and B'C1 (excluding points D and B').
The refrigerant of the present disclosure has a low GWP.

DESCRIPTION OF EMBODIMENTS

Figure 1:
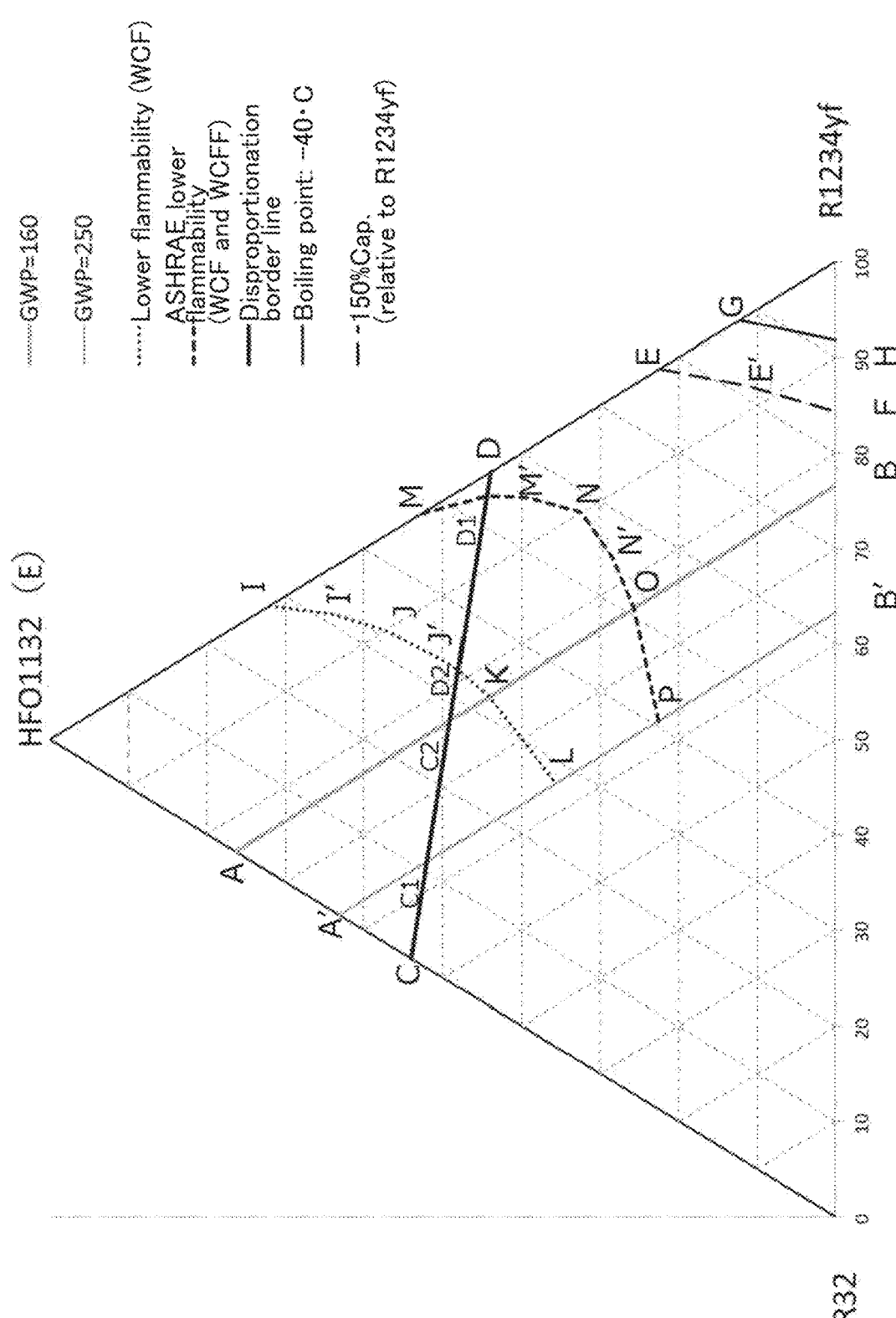
FIG. 1 is a ternary diagram showing formulations of the refrigerant of the present disclosure.

In order to achieve the above object, the present inventors conducted extensive research and found that various mixed refrigerants described below have the characteristics described above.
The present disclosure has been completed as a result of further research based on this finding. The present disclosure includes the following embodiments.

Definition of Terms

In the present specification, the term "refrigerant" includes at least compounds that are specified in ISO 817 (International Organization for Standardization) and that are given a refrigerant number (ASHRAE number) representing the type of refrigerant with "R" at the beginning, and further includes refrigerants that have properties equivalent to those of such refrigerants, even though a refrigerant number is not yet given. Refrigerants are broadly divided into fluorocarbon compounds and non-fluorocarbon compounds in terms of the structure of the compounds. Fluorocarbon compounds include chlorofluorocarbons (CFC), hydrochlorofluorocarbons (HCFC), and hydrofluorocarbons (HFC).

In the present specification, the phrase "composition comprising a refrigerant" at least includes (1) a refrigerant itself (including a mixture of refrigerants), (2) a composition that further comprises other components and that can be mixed with at least a refrigeration oil to obtain a working fluid for a refrigerating machine, and (3) a working fluid for a refrigerating machine containing a refrigeration oil. In the present specification, of these three embodiments, the composition (2) is referred to as a "refrigerant composition" so as to distinguish it from a refrigerant itself (including a mixture of refrigerants). Further, the working fluid for a refrigerating machine (3) is referred to as a "refrigeration-oil-containing working fluid" so as to distinguish it from the "refrigerant composition."

In the present specification, when the term "alternative" is used in a context in which the first refrigerant is replaced with the second refrigerant, the first type of "alternative" means that equipment designed for operation using the first refrigerant can be operated using the second refrigerant under optimum conditions, optionally with changes of only a few parts (at least one of the following: refrigeration oil, gasket, packing, expansion valve, dryer, and other parts) and equipment adjustment. In other words, this type of alternative means that the same equipment is operated with an alternative refrigerant. Embodiments of this type of "alternative" include "drop-in alternative," "nearly drop-in alternative," and "retrofit," in the order in which the extent of changes and adjustment necessary for replacing the first refrigerant with the second refrigerant is smaller.

The term "alternative" also includes a second type of "alternative," which means that equipment designed for operation using the second refrigerant is operated for the same use as the existing use with the first refrigerant by using the second refrigerant. This type of alternative means that the same use is achieved with an alternative refrigerant.

In the present specification, the term "refrigerating machine" refers to machines in general that draw heat from an object or space to make its temperature lower than the temperature of ambient air, and maintain a low temperature. In other words, refrigerating machines refer to conversion machines that gain energy from the outside to do work, and that perform energy conversion, in order to transfer heat from where the temperature is lower to where the temperature is higher.

In the present specification, "air-conditioning equipment for vehicles" is a type of refrigeration apparatus for use in vehicles, such as gasoline vehicles, hybrid vehicles, electric vehicles, and hydrogen vehicles. The air-conditioning equipment for vehicles refers to a refrigeration apparatus that has a refrigeration cycle in which heat exchange is performed by an evaporator using a liquid refrigerant, the evaporated refrigerant gas is absorbed by a compressor, the adiabatically compressed refrigerant gas is cooled and liquefied with a condenser, the liquefied refrigerant is adiabatically expanded by passing it through an expansion valve, and then the refrigerant is supplied again in the form of a liquid to the evaporator.

In the present specification, a refrigerant having a "WCF lower flammability" means that the most flammable composition (worst case of formulation for flammability: WCF) has a burning velocity of 10 cm/s or less according to the US ANSI/ASHRAE Standard 34-2013.

Further, in the present specification, a refrigerant having ASHRAE lower flammability (WCF&WCFF lower flammability) means that the burning velocity of WCF is 10 cm/s or less, that the most flammable fraction composition (worst case of fractionation for flammability: WCFF), which is specified by performing a leakage test during storage, shipping, or use based on ANSI/ASHRAE 34-2013 using WCF, has a burning velocity of 10 cm/s or less, and that flammability classification according to the US ANSI/ASHRAE Standard 34-2013 is determined to be classified as Class 2L.

In the present specification, the unit of pressure is an absolute pressure unless otherwise specified.

1. Refrigerant

The refrigerant of the present disclosure comprises HFO-1132(E), R32 and HFO-1234yf.

The refrigerant of the present disclosure is a low-GWP mixed refrigerant.

In the refrigerant of the present disclosure, when the mass % of HFO-1132(E), R32, and R1234yf based on their sum is respectively represented by x, y, and z, if coordinates (x,y,z) in a ternary composition diagram in which the sum of HFO-1132(E), R32, and R1234yf is 100 mass % satisfy the following requirements, the disproportionation reaction does not occur at 3 MPa and 150° C., and the refrigerant has a boiling point of –40° C. or lower and a GWP of 250 or less.

<Requirement>

When the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by straight lines C1D, DG, GH, HB', and B'C1 that connect the following 5 points:

point C1 (52.0, 36.9, 11.1),
point D (44.0, 0.0, 56.0),
point G (12.2, 0.0, 87.8),
point H (0.0, 8.2, 91.8), and
point B' (0.0, 36.6, 63.4), or on the straight lines C1D and B'C1 (excluding points D and B').

In the refrigerant of the present disclosure, when the mass % of HFO-1132(E), R32, and R1234yf based on their sum is respectively represented by x, y, and z, if coordinates (x,y,z) in a ternary composition diagram in which the sum of HFO-1132(E), R32, and R1234yf is 100 mass % satisfy the following requirements, the disproportionation reaction does not occur at 3 MPa and 150° C., and the refrigerant has a boiling point of –40° C. or lower and a GWP of 160 or less.

<Requirement>

Coordinates (x,y,z) are within the range of a figure surrounded by straight lines C2D, DG, GH, HB, and BC2 that connect the following 5 points:

point C2 (49.1, 23.5, 27.4),
point D (44.0, 0.0, 56.0),
point G (12.2, 0.0, 87.8),
point H (0.0, 8.2, 91.8), and
point B (0.0, 23.3, 76.7), or on the above straight lines C2D and BC2 (excluding points D and B).

In the refrigerant of the present disclosure, when the mass % of HFO-1132(E), R32, and R1234yf based on their sum is respectively represented by x, y, and z, if coordinates (x,y,z) in a ternary composition diagram in which the sum of HFO-1132(E), R32, and R1234yf is 100 mass % satisfy the following requirements, the disproportionation reaction does not occur at 3 MPa and 150° C., and the refrigerant ensures a WCF nonflammability, a boiling point of –40° C. or lower, and a GWP of 250 or less.

<Requirement>

Coordinates (x,y,z) are within the range of a figure surrounded by line segments LK, KD2, D2D, DG, GH, HB', and B'L that connect the following 7 points:

point L (35.6, 36.8, 27.6),
point K (44.2, 23.4, 32.4),
point D2 (48.1, 18.7, 33.2),
point D (44.0, 0.0, 56.0),
point G (12.2, 0.0, 87.8),
point H (0.0, 8.2, 91.8), and
point B' (0.0, 36.6, 63.4), or on the line segments LK, KD2, D2D, and B'L (excluding points D and B');

the line segments LK, D2D, DG, GH, HB', and B'L are straight lines; and the coordinates (x,y,z) of points on the above line segment KD2 are represented by $(x, 0.01727x^2-2.7828x+112.643, -0.01727x^2+1.7828x-12.643)$.

In the refrigerant of the present disclosure, when the mass % of HFO-1132(E), R32, and R1234yf based on their sum is respectively represented by x, y, and z, if coordinates (x,y,z) in a ternary composition diagram in which the sum of HFO-1132(E), R32, and R1234yf is 100 mass % satisfy the following requirements, the disproportionation reaction does not occur at 3 MPa and 150° C., and the refrigerant ensures a WCCF nonflammability, a boiling point of –40° C. or lower, and a GWP of 250 or less.

<Requirement>

In the refrigerant, coordinates (x,y,z) are within the range of a figure surrounded by line segments PO, ON', N'N, NM', M'D1, D1D, DG, GH, HB', and B'P that connect the following 10 points:

point P (22.6, 36.8, 40.6),
point O (25.7, 23.4, 50.9,
point N' (28.4, 16.7, 54.9),
point N (32.4, 10.0, 57.6),
point M' (39.2, 5.0, 55.8),
point D1 (44.5, 2.2, 53.3),
point D (44.0, 0.0, 56.0),
point G (12.2, 0.0, 87.8),
point H (0.0, 8.2, 91.8), and
point B' (0.0, 36.6, 63.4), or on the line segments PO, ON', N'N, NM', M'D1, D1D, and B'P (excluding points D and B');

the line segments PO, D1D, DG, GH, HB', and B'P are straight lines;

the coordinates (x,y,z) of points on the above line segments ON' and N'N are represented by $(x, 0.1204x^2-8.9935x+175.03, -0.1204x^2+7.9935x-75.03)$; and the coordinates (x,y,z) of points on the line segments NM' and M'D1 are represented by $(x, 0.01792x^2-2.019x+56.594, -0.01792x^2+1.019x+43.406)$.

In the refrigerant of the present disclosure, when the mass % of HFO-1132(E), R32, and R1234yf based on their sum is respectively represented by x, y, and z, if coordinates (x,y,z) in a ternary composition diagram in which the sum of HFO-1132(E), R32, and R1234yf is 100 mass % satisfy the following requirements, the disproportionation reaction does not occur at 3 MPa and 150° C., and the refrigerant ensures a WCCF nonflammability, a refrigerating capacity (Cap) ratio of 150% or more relative to R1234yf, and a GWP of 250 or less.

<Requirement>

In the refrigerant, coordinates (x,y,z) are within the range of a figure surrounded by line segments PO, ON', N'N, NM', M'D1, D1D, DE, EE', E'F, FB', and B'P that connect the following 11 points:

point P (22.6, 36.8, 40.6),
point O (25.7, 23.4, 50.9,
point N' (28.4, 16.7, 54.9),
point N (32.4, 10.0, 57.6),
point M' (39.2, 5.0, 55.8),
point D1 (44.5, 2.2, 53.3),
point D (44.0, 0.0, 56.0),
point E (22.4, 0.0, 77.6),
point E' (11.2, 7.4, 81.4),
point F (0.0, 15.6, 84.4), and
point B' (0.0, 36.6, 63.4), or
on the above line segments PO, ON', N'N, NM', M'D1, D1D, EE', E'F, and B'P (excluding points D, E, and B');

the above line segments PO, D1D, DE, FB', and B'P are straight lines;

the coordinates (x,y,z) of points on the above line segments ON' and N'N are represented by (x, $0.1204x^2-8.9935x+175.03$, $-0.1204x^2+7.9935x-75.03$);

the coordinates (x,y,z) of points on the above line segments NM' and M'D1 are represented by (x, $0.01792x^2-2.019x+56.594$, $-0.01792x^2+1.019x+43.406$); and the coordinates (x,y,z) of points on the line segments EE' and E'F are represented by (x, $0.0032x^2-0.7679x+15.6$, $-0.0032x^2-0.2321x+84.4$).

In the refrigerant of the present disclosure, when the mass % of HFO-1132(E), R32, and R1234yf based on their sum is respectively represented by x, y, and z, if coordinates (x,y,z) in a ternary composition diagram in which the sum of HFO-1132(E), R32, and R1234yf is 100 mass % satisfy the following requirements, the disproportionation reaction does not occur at 3 MPa and 150° C., and the refrigerant ensures a WCCF nonflammability, a refrigerating capacity (Cap) ratio of 150% or more relative to R1234yf, and a GWP of 160 or less.

<Requirement>

In the refrigerant, coordinates (x,y,z) are within the range of a figure surrounded by line segments ON', N'N, NM', M'D1, D1D, DE, EE', E'F, FB, and BO that connect the following 10 points:

point O (25.7, 23.4, 50.9,
point N' (28.4, 16.7, 54.9),
point N (32.4, 10.0, 57.6),
point M' (39.2, 5.0, 55.8),
point D1 (44.5, 2.2, 53.3),
point D (44.0, 0.0, 56.0),
point E (22.4, 0.0, 77.6),
point E' (11.2, 7.4, 81.4),
point F (0.0, 15.6, 84.4), and
point B (0.0, 23.3, 76.7), or
on the line segments ON', N'N, NM', M'D1, D1D, EE', E'F, and BO (excluding points D, E, and B);

the line segments D1D, DE, FB, and BO are straight lines;

the coordinates (x,y,z) of points on the line segments ON' and N'N are represented by (x, $0.1204x^2-8.9935x+175.03$, $-0.1204x^2+7.9935x-75.03$);

the coordinates (x,y,z) of points on the above line segments NM' and M'D1 are represented by (x, $0.01792x^2-2.019x+56.594$, $-0.01792x^2+1.019x+43.406$); and the coordinates (x,y,z) of points on the line segments EE' and E'F are represented by (x, $0.0032x^2-0.7679x+15.6$, $-0.0032x^2-0.2321x+84.4$).

The refrigerant of the present disclosure may be a refrigerant comprising 28±0.5 mass %, 21.5±0.5 mass %, and 50.5±0.5 mass % of HFO-1132(E), R32, and HFO-1234yf, respectively, based on their sum.

The refrigerant of the present disclosure can suppress the disproportionation reaction even when the refrigerant pressure is locally 3 MPa and the refrigerant temperature is locally 150° C. in the refrigeration cycle.

In addition, since the refrigerant of the present disclosure has a boiling point of −40.0° C. or lower, there is an advantage that the refrigerant is easy to use in heating by a heat pump. For example, when the refrigerant of the present disclosure is used for operating a refrigeration cycle of air-conditioning equipment for vehicles, there is an advantage that heating can be performed by a heat pump that consumes less power than an electric heater. Examples of the "air-conditioning equipment for vehicles include systems for gasoline vehicles, hybrid vehicles, electric vehicles, and hydrogen vehicles.

The refrigerant of the present disclosure may further comprise additional refrigerants in addition to HFO-1132 (E), R32 and HFO-1234yf as long as the above properties and effects are not impaired. In this respect, the refrigerant of the present disclosure in an embodiment preferably comprises HFO-1132(E), R32, and HFO-1234yf in a total amount of 99.5 mass % or more, more preferably 99.75 mass % or more, still more preferably 99.9 mass % or more, further preferably 99.999 mass %, and most preferably 99.9999 mass % or more, based on the entire refrigerant. The refrigerant of the present disclosure may substantially consist only of HFO-1132(E), R32, and HFO-1234yf, and in this case, the refrigerant of the present disclosure may also consist only of HFO-1132(E), R32, HFO-1234yf, and an unavoidable impurity. The refrigerant of the present disclosure may consist only of HFO-1132(E), R32, and HFO-1234yf.

Additional refrigerants are not particularly limited and can be widely selected. The mixed refrigerant may contain one additional refrigerant, or two or more additional refrigerants.

Examples of the additional refrigerant include acetylene, HFO-1132a, HFO-1141, HFO-1123, HFC-143a, HFC-134a, Z-HFO-1132, HFO-1243zf, HFC-245cb, HCFC-1122, HCFC-124, CFC-1113, and 3,3,3-trifluoropropyne.

The composition of the present disclosure also includes a composition comprising a refrigerant,
the refrigerant comprising:
HFO-1132(E), R32, and R1234yf; and
at least one additional refrigerant selected from the group consisting of acetylene, HFO-1132a, HFO-1141, HFO-1123, HFC-143a, HFC-134a, Z-HFO-1132, HFO-1243zf, HFC-245cb, HCFC-1122, HCFC-124, CFC-1113, HFC-152a, HFC-161, and 3,3,3-trifluoropropyne. The total amount of the additional refrigerant is preferably 0.01 mass % or less based on the entire refrigerant.

2. Refrigerant Composition

The refrigerant composition according to the present disclosure comprises at least the refrigerant according to present disclosure, and can be used for the same use as the refrigerant according to the present disclosure. Moreover, the refrigerant composition according to the present disclosure can be further mixed with at least a refrigeration oil to thereby obtain a working fluid for a refrigerating machine.

The refrigerant composition according to the present disclosure further comprises at least one other component in addition to the refrigerant according to the present disclosure. The refrigerant composition according to the present disclosure may comprise at least one of the following other components, if necessary. As described above, when the refrigerant composition according to the present disclosure is used as a working fluid in a refrigerating machine, it is generally used as a mixture with at least a refrigeration oil. Therefore, it is preferable that the refrigerant composition according to the present disclosure does not substantially comprise a refrigeration oil. Specifically, in the refrigerant composition according to the present disclosure, the content of the refrigeration oil based on the entire refrigerant composition is preferably 1 mass % or less, and more preferably 0.1 mass % or less.

2.1. Water

The refrigerant composition according to the present disclosure may contain a small amount of water. The water content of the refrigerant composition is preferably 0.1 mass % or less based on the entire refrigerant. A small amount of water contained in the refrigerant composition stabilizes double bonds in the molecules of unsaturated fluorocarbon compounds that can be present in the refrigerant, and makes it less likely that the unsaturated fluorocarbon compounds will be oxidized, thus increasing the stability of the refrigerant composition.

The composition of the present disclosure also includes a composition comprising a refrigerant, the refrigerant comprising HFO-1132(E), R32, R1234yf, and 0.1% or less of water.

2.2. Tracer

A tracer is added to the refrigerant composition according to the present disclosure at a detectable concentration so that when the refrigerant composition has been diluted, contaminated, or undergone other changes, the tracer can trace the changes.

The refrigerant composition according to the present disclosure may comprise a single tracer, or two or more tracers.

The tracer is not limited, and can be suitably selected from commonly used tracers.

Examples of tracers include hydrofluorocarbons, hydrochlorofluorocarbons, chlorofluorocarbons, hydrochlorocarbons, fluorocarbons, deuterated hydrocarbons, deuterated hydrofluorocarbons, perfluorocarbons, fluoroethers, brominated compounds, iodinated compounds, alcohols, aldehydes, ketones, and nitrous oxide ($N_2O$). The tracer is particularly preferably a hydrofluorocarbon, a hydrochlorofluorocarbon, a chlorofluorocarbon, a hydrochlorocarbon, a fluorocarbon, or a fluoroether.

The following compounds are preferable as the tracer.

FC-14 (tetrafluoromethane, $CF_4$)
HCC-40 (chloromethane, $CH_3Cl$)
HFC-23 (trifluoromethane, $CHF_3$)
HFC-41 (fluoromethane, $CH_3Cl$)
HFC-125 (pentafluoroethane, $CF_3CHF_2$)
HFC-134a (1,1,1,2-tetrafluoroethane, $CF_3CH_2F$)
HFC-134 (1,1,2,2-tetrafluoroethane, $CHF_2CHF_2$)
HFC-143a (1,1, 1-trifluoroethane, $CF_3CH_3$)
HFC-143 (1,1,2-trifluoroethane, $CHF_2CH_2F$)
HFC-152a (1,1-difluoroethane, $CH_3CHF_2$)
HFC-152 (1,2-difluoroethane, $CH_2FCH_2F$)
HFC-161 (fluoroethane, $CH_3CH_2F$)
HFC-245fa (1,1,1,3,3-pentafluoropropane, $CF_3CH_2CHF_2$)

HFC-236fa (1,1,1,3,3,3-hexafluoropropane, $CF_3CH_2CF_3$)
HFC-236ea (1,1,1,2,3,3-hexafluoropropane, $CF_3CHFCHF_2$)
HFC-227ea (1,1,1,2,3,3,3-heptafluoropropane, $CF_3CHFCF_3$)
HCFC-22 (chlorodifluoromethane, $CHClF_2$)
HCFC-31 (chlorofluoromethane, $CH_2ClF$)
CFC-1113 (chlorotrifluoroethylene, $CF_2\!=\!CClF$)
HFE-125 (trifluoromethyl-difluoromethyl ether, $CF_3OCHF_2$)
HFE-134a (trifluoromethyl-fluoromethyl ether, $CF_3OCH_2F$)
HFE-143a (trifluoromethyl-methyl ether, $CF_3OCH_3$)
HFE-227ea (trifluoromethyl-tetrafluoroethyl ether, $CF_3OCHFCF_3$)
HFE-236fa (trifluoromethyl-trifluoroethyl ether, $CF_3OCH_2CF_3$)

The refrigerant composition of the present disclosure may comprise about 10 parts per million by weight (ppm) or more of tracers in total, based on the entire refrigerant composition. The refrigerant composition of the present disclosure may also comprise about 1000 ppm or less of tracers in total, based on the entire refrigerant composition. The refrigerant composition of the present disclosure may preferably comprise about 30 ppm or more and more preferably about 50 ppm or more of tracers in total, based on the entire refrigerant composition. The refrigerant composition of the present disclosure may preferably comprise about 500 ppm or less and about 300 ppm or less of tracer in total, based on the entire refrigerant composition.

2.3. Ultraviolet Fluorescent Dye

The refrigerant composition according to the present disclosure may comprise a single ultraviolet fluorescent dye, or two or more ultraviolet fluorescent dyes.

The ultraviolet fluorescent dye is not limited, and can be suitably selected from commonly used ultraviolet fluorescent dyes.

Examples of ultraviolet fluorescent dyes include naphthalimide, coumarin, anthracene, phenanthrene, xanthene, thioxanthene, naphthoxanthene, fluorescein, and derivatives thereof. The ultraviolet fluorescent dye is particularly preferably either naphthalimide or coumarin, or both.

2.4. Stabilizer

The refrigerant composition according to the present disclosure may comprise a single stabilizer, or two or more stabilizers.

The stabilizer is not limited, and can be suitably selected from commonly used stabilizers.

Examples of stabilizers include nitro compounds, ethers, and amines.

Examples of nitro compounds include aliphatic nitro compounds, such as nitromethane and nitroethane; and aromatic nitro compounds, such as nitro benzene and nitro styrene.

Examples of ethers include 1,4-dioxane.

Examples of amines include 2,2,3,3,3-pentafluoropropylamine and diphenylamine.

Examples of stabilizers also include butylhydroxyxylene and benzotriazole.

The content of the stabilizer is preferably 0.01 mass % or more, and more preferably 0.05 mass % or more, based on the entire refrigerant. The content of the stabilizer is preferably 5 mass % or less, and more preferably 2 mass % or less, based on the entire refrigerant.

2.5. Polymerization Inhibitor

The refrigerant composition according to the present disclosure may comprise a single polymerization inhibitor, or two or more polymerization inhibitors.

The polymerization inhibitor is not limited, and can be suitably selected from commonly used polymerization inhibitors.

Examples of polymerization inhibitors include 4-methoxy-1-naphthol, hydroquinone, hydroquinone methyl ether, dimethyl-t-butylphenol, 2,6-di-tert-butyl-p-cresol, and benzotriazole.

The content of the polymerization inhibitor is preferably 0.01 mass % or more, and more preferably 0.05 mass % or more, based on the entire refrigerant. The content of the polymerization inhibitor is preferably 5 mass % or less, and more preferably 2 mass % or less, based on the entire refrigerant.

3. Refrigeration-Oil-Containing Working Fluid

The refrigeration-oil-containing working fluid according to the present disclosure comprises at least the refrigerant or refrigerant composition according to the present disclosure and a refrigeration oil, for use as a working fluid in a refrigerating machine. Specifically, the refrigeration-oil-containing working fluid according to the present disclosure is obtained by mixing a refrigeration oil used in a compressor of a refrigerating machine with the refrigerant or the refrigerant composition. The refrigeration-oil-containing working fluid generally comprises 10 mass % or more of refrigeration oil. The refrigeration-oil-containing working fluid generally comprises 50 mass % or less of refrigeration oil.

3.1. Refrigeration Oil

The composition according to the present disclosure may comprise a single refrigeration oil, or two or more refrigeration oils.

The refrigeration oil is not limited, and can be suitably selected from commonly used refrigeration oils. In this case, refrigeration oils that are superior in the action of increasing the miscibility with the mixture and the stability of the mixture, for example, are suitably selected as necessary.

The base oil of the refrigeration oil is preferably, for example, at least one member selected from the group consisting of polyalkylene glycols (PAG), polyol esters (POE), and polyvinyl ethers (PVE).

The refrigeration oil may further contain additives in addition to the base oil. The additive may be at least one member selected from the group consisting of antioxidants, extreme-pressure agents, acid scavengers, oxygen scavengers, copper deactivators, rust inhibitors, oil agents, and antifoaming agents.

A refrigeration oil with a kinematic viscosity of 5 cSt or more at 40° C. is preferable from the standpoint of lubrication. A refrigeration oil with a kinematic viscosity of 400 cSt or less at 40° C. is preferable from the standpoint of lubrication.

The refrigeration-oil-containing working fluid according to the present disclosure may further optionally contain at least one additive. Examples of additives include compatibilizing agents described below.

3.2. Compatibilizing Agent

The refrigeration-oil-containing working fluid according to the present disclosure may comprise a single compatibilizing agent, or two or more compatibilizing agents.

The compatibilizing agent is not limited, and can be suitably selected from commonly used compatibilizing agents.

Examples of compatibilizing agents include polyoxyalkylene glycol ethers, amides, nitriles, ketones, chlorocarbons, esters, lactones, aryl ethers, fluoroethers, and 1,1,1-trifluoroalkanes. The compatibilizing agent is particularly preferably a polyoxyalkylene glycol ether.

4. Method for Operating Refrigerating Machine

The method for operating a refrigerating machine according to the present disclosure is a method for operating a refrigerating machine using the refrigerant according to the present disclosure.

Specifically, the method for operating a refrigerating machine according to the present disclosure comprises the step of circulating the refrigerant according to the present disclosure in a refrigerating machine.

5. Method for Suppressing Disproportionation Reaction

The method for suppressing the disproportionation reaction is a method for suppressing a disproportionation reaction of HFO-1132(E), comprising the step of operating a refrigeration cycle using the refrigerant of the present disclosure.

In the method for suppressing the disproportionation reaction of the present disclosure, particularly, it is possible to obtain an effect that the disproportionation reaction of HFO-1132 (E) does not occur even when the refrigerant pressure is 3.0 MPa and the refrigerant temperature is 150° C.

According to the method for suppressing a disproportionation reaction of the present disclosure, it is possible to operate a refrigeration cycle while suppressing a disproportionation reaction even in a refrigerating machine that is not specifically provided with a means for suppressing the disproportionation reaction.

6. Use for Suppressing Disproportionation Reaction

The use of the present disclosure is the use of R32 and HFO-1234yf for suppressing the disproportionation reaction of HFO-1132 (E), wherein the suppression of the disproportionation reaction is carried out by mixing HFO-1132 (E), R32, and HFO-1234yf at a mixing ratio of the refrigerant of the present disclosure.

In the use for suppressing the disproportionation reaction of the present disclosure, particularly, it is possible to obtain an effect that the disproportionation reaction of HFO-1132 (E) does not occur even when the refrigerant pressure is 3.0 MPa and the refrigerant temperature is 150° C.

The embodiments are described above; however, it will be understood that various changes in form and detail can be made without departing from the spirit and scope of the claims.

EXAMPLES

The present disclosure is described in more detail below with reference to Examples. However, the present disclosure is not limited to the Examples.

Mixed refrigerants were prepared by mixing HFO-1132 (E), R32, and HFO-1234yf at mass % based on their sum shown in Table 1.

Each of these mixed refrigerants was examined for disproportionation reactions under the following test methods and conditions.

Test Method

A refrigerant composition to be tested was transferred into a test container and heated to 150° C., and then a voltage was applied to a Pt wire in the container to fuse the wire, thereby applying energy of 30 J to the refrigerant composition. The occurrence of the disproportionation reaction was determined by a rapid increase in pressure and temperature in the apparatus.

Test Conditions

Test container: 38 cc, made of stainless steel (SUS),

Test temperature: 150° C.

Pressure: 3 MPa

Evaluation Criteria

"Non-explosion": the temperature or pressure after the fusion of the Pt wire is less than 2 times, and no rapid disproportionation reaction occurs.

"Explosion": the temperature or pressure after the fusion of the Pt wire reaches twice or more and a rapid disproportionation reaction occurs

TABLE 1

| Item | Unit | Experiment series 1 | | | Experiment series 2 | | | | | Experiment series 3 | | |
|---|---|---|---|---|---|---|---|---|---|---|---|---|
| | | Comp. Ex. 1 | Ex. 1 | Ex. 2 | Comp. Ex. 2 | Comp. Ex. 3 | Ex. 3 | Ex. 4 | Ex. 5 | Comp. Ex. 4 | Ex. 6 | Ex. 7 |
| HFO-1132(E) | mass % | 56.0 | 54.0 | 52.0 | 51.0 | 51.0 | 49.0 | 47.0 | 47.0 | 46.0 | 44.0 | 42.0 |
| R32 | mass % | 44.0 | 46.0 | 48.0 | 23.0 | 21.0 | 23.0 | 25.0 | 23.0 | 0.0 | 0.0 | 0.0 |
| R1234yf | mass % | 0.0 | 0.0 | 0.0 | 26.0 | 28.0 | 28.0 | 28.0 | 30.0 | 54.0 | 56.0 | 58.0 |
| Disproportionation reaction (3 Mpa) | — | Explosion | Non-explosion | Non-explosion | Explosion | Explosion | Non-explosion | Non-explosion | Non-explosion | Explosion | Non-explosion | Non-explosion |

The results in Table 1 indicate that the refrigerant of the present disclosure does not undergo disproportionation in the region shown in the ternary diagram of FIG. 1.

Figure 2:
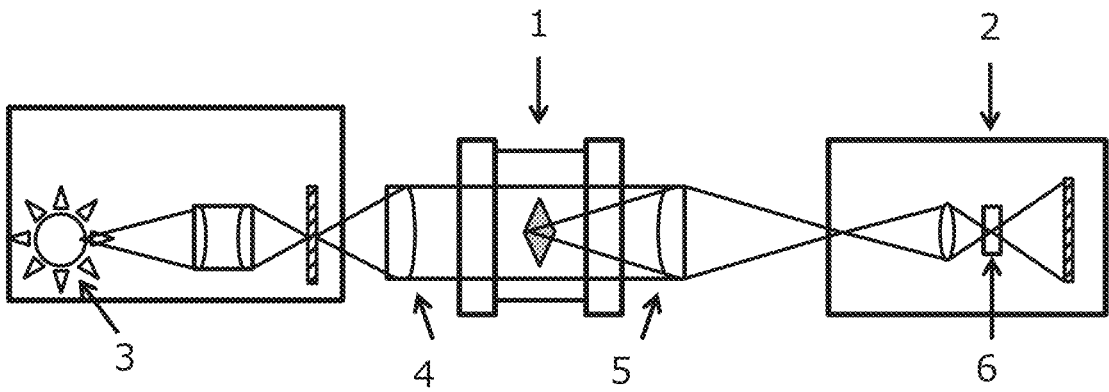
FIG. 2 is a view showing an apparatus used for burning velocity tests of Examples.

A burning velocity test was performed using the apparatus shown in FIG. 2 in the following manner. First, the mixed refrigerants used had a purity of 99.5% or more, and were degassed by repeating a cycle of freezing, pumping, and thawing until no traces of air were observed on the vacuum gauge. The burning velocity was measured by the closed method. The initial temperature was ambient temperature. Ignition was performed by generating an electric spark between the electrodes in the center of a sample cell. The duration of the discharge was 1.0 to 9.9 ms, and the ignition energy was typically about 0.1 to 1.0 J. The propagation of the flame was visualized by schlieren photography. A cylindrical container (inner diameter: 155 mm, length: 198 mm) equipped with two acrylic light-transmission windows was used as the sample cell, and a xenon lamp was used as the light source. Schlieren images of the flame were recorded with a high-speed digital video camera at a frame rate of 600 fps and stored on a PC.

The burning velocity (Su (cm/s)) is expressed by the volume of unburned gas consumed by the flame surface of a unit area per unit time and was calculated by the following equation.

$$S = Sb * \rho u / \rho b$$

Sb: flame propagation velocity (cm/s)
$\rho u$: adiabatic flame temperature (unburned)
$\rho b$: adiabatic flame temperature (burned)
Here, Sb was determined from the schlieren video images, $\rho u$ was calculated from a measurement temperature, and $\rho b$ was calculated from the combustion heat and constant pressure-specific heat of combustion gas. The table 2 shows the results.

TABLE 2

| | Item | Unit | I | I' | J | J' | K | L |
|---|---|---|---|---|---|---|---|---|
| WCF | HFO-1132(E) | mass % | 72 | 63.8 | 57.2 | 50 | 44.2 | 35.6 |
| | R32 | mass % | 0 | 5 | 10 | 16.7 | 23.4 | 36.8 |
| | R1234yf | mass % | 28 | 31.2 | 32.8 | 33.3 | 32.4 | 27.6 |
| | Burning velocity (WCF) | cm/s | 10 | 10 | 10 | 10 | 10 | 10 |

| | Item | Unit | M | M' | N |
|---|---|---|---|---|---|
| WCF | HFO-1132(E) | mass % | 52.6 | 39.2 | 32.4 |
| | R32 | mass % | 0.0 | 5.0 | 10.0 |
| | R1234yf | mass % | 47.4 | 55.8 | 57.6 |
| | Leak condition that results in WCFF | | storage, shipping, −40° C., 0% release, gas phase side | storage, shipping, −40° C., 0% release, gas phase side | storage, shipping, −40° C., 0% release, gas phase side |
| WCFF | HFO-1132(E) | mass % | 72.0 | 57.8 | 48.7 |
| | R32 | mass % | 0.0 | 9.5 | 17.9 |
| | R1234yf | mass % | 28.0 | 32.7 | 33.4 |
| | Burning velocity (WCF) | cm/s | 8 or less | 8 or less | 8 or less |
| | Burning velocity (WCFF) | cm/s | 10 | 10 | 10 |

| | Item | Unit | N' | O | P |
|---|---|---|---|---|---|
| WCF | HFO-1132(E) | mass % | 28.4 | 25.7 | 22.6 |
| | R32 | mass % | 16.7 | 23.4 | 36.8 |
| | R1234yf | mass % | 54.9 | 50.9 | 40.6 |
| | Leak condition that results in WCFF | | storage, shipping, −40° C., 0% release, gas phase side | storage, shipping, −40° C., 0% release, gas phase side | storage, shipping, −40° C., 0% release, gas phase side |
| WCFF | HFO-1132(E) | mass % | 41.9 | 36.9 | 31.4 |
| | R32 | mass % | 26.7 | 34.8 | 45.7 |
| | R1234yf | mass % | 31.4 | 28.3 | 23.0 |
| | Burning velocity (WCF) | cm/s | 8 or less | 8 or less | 8 or less |
| | Burning velocity (WCFF) | cm/s | 10 | 10 | 10 |

The results in Table 2 indicate that the refrigerant of the present disclosure ensures a WCF nonflammability or WCFF nonflammability in the region shown in the ternary diagram of FIG. 1.

The GWP of HFO-1132(E) was set to 1, and the GWP of mixed refrigerants was evaluated with the GWP of R32 and HFO-1234yf based on the values stated in the Intergovernmental Panel on Climate Change (IPCC), fourth report. The COP, refrigerating capacity, discharge temperature, and boiling point of mixed refrigerants were determined by performing theoretical refrigeration cycle calculations for the mixed refrigerants using the National Institute of Science and Technology (NIST) and Reference Fluid Thermodynamic and Transport Properties Database (Refprop 9.0) under the following conditions. The physical property data of HFO-1132 (E) were determined from measured values.
Evaporation temperature: −30° C.
Condensation temperature: 30° C.
Superheating temperature: 5K
Subcooling temperature: 5K
Compressor efficiency: 70%

In the following tables, "COP ratio" and "refrigerating capacity ratio" each indicate a proportion (s) relative to R1234yf.
In the tables, "boiling point (° C.)" indicates the temperature at which a liquid phase of the mixed refrigerant reaches atmospheric pressure (101.33 kPa). In the table, "power consumption (%) of driving force" indicate electric energy used for traveling an electric vehicle and is expressed as a ratio of power consumption when the refrigerant is HFO-1234yf. In the tables, "power consumption (%) for heating" indicates electric energy used by an electric vehicle to operate heating and is expressed as a ratio of power consumption when the refrigerant is HFO-1234yf.

In the following tables, "possible travel distance (with heating)" represents a relative proportion (%) of the distance that can be traveled by an electric vehicle equipped with a secondary battery with a certain electric capacity while having a heater turned on if possible travel distance (without heating) is set to 100% when the vehicle is driven without heating (power consumption for heating is 0).

For the heating method, an electric heater system was used for heating for the refrigerant having a boiling point of higher than −40° C., and a heat pump system was used for heating for the refrigerant having a boiling point of −40° C. or lower.

The power consumption during heating was determined based on the following equation. The heating COP means "heating efficiency".

$$\text{Power consumption during heating=heating capacity/heating COP}$$

Regarding heating efficiency, in the case of an electric heater, the heating COP=1, and electrodes equivalent to driving force are consumed for heating. In other words, the power consumption for heating is E=E/(1+COP).

On the other hand, in the case of a heat pump, the heating COP was also determined by theoretical refrigeration cycle calculations for the mixed refrigerants using Refprop 9.0 (manufactured by NIST) under the following conditions.
Evaporation temperature: −30° C.
Condensation temperature: 30° C.
Superheating temperature: 5K
Subcooling temperature: 5K
Compressor efficiency: 70%

The possible travel distance was determined according to the following equation.

$$\text{possible travel distance=(battery capacity)/(power consumption of driving force+power consumption for heating)}$$

These values, together with the GWP for each mixed refrigerant, are shown in the following tables. The specific COP and specific refrigerating capacity are shown as a proportion relative to HFO-1234y.

The coefficient of performance (COP)was determined according to the following equation.

$$\text{COP=(refrigerating capacity or heating capacity)/power consumption}$$

TABLE 3

| | Item | Unit | Ref. Ex. 1 | Comp. Ex. 1 | Comp. Ex. 2 A' | Comp. Ex. 3 B' | Comp. Ex. 4 A | Comp. Ex. 5 B | Comp. Ex. 6 C | Ex. 1 C1 | Ex. 2 C2 | Ex. 3 D2 |
|---|---|---|---|---|---|---|---|---|---|---|---|---|
| Proportion of | E-HFO-1132 | mass % | 0.0 | 0.0 | 63.1 | 0.0 | 76.4 | 0.0 | 54.0 | 52.0 | 49.1 | 48.1 |
| formulations | R32 | mass % | 0.0 | 0.0 | 36.9 | 36.6 | 23.6 | 23.3 | 46.0 | 36.9 | 23.5 | 18.7 |
| | R1234yf | mass % | 0.0 | 100.0 | 0.0 | 63.4 | 0.0 | 76.7 | 0.0 | 11.1 | 27.4 | 33.2 |
| | R134a | mass % | 100.0 | 0.0 | 0.0 | 0.0 | 0.0 | 0.0 | 0.0 | 0.0 | 0.0 | 0.0 |
| | GWP(AR4) | — | 1430 | 4 | 250 | 250 | 160 | 160 | 311 | 250 | 160 | 128 |
| COP ratio (relative to R1234yf) | | % | 105 | 100 | 100 | 101 | 100 | 101 | 100 | 100 | 100 | 100 |
| Refrigerating capacity ratio(relative to R1234yf) | | % | 99 | 100 | 317 | 204 | 308 | 172 | 321 | 301 | 266 | 253 |
| Power consumption of driving force | | % | 100 | 100 | 100 | 100 | 100 | 100 | 100 | 100 | 100 | 100 |
| Power consumption for heating | | % | 95 | 100 | 33 | 33 | 33 | 33 | 33 | 33 | 33 | 33 |
| Possible travel distance (without heating) | | % | 100 | 100 | 100 | 100 | 100 | 100 | 100 | 100 | 100 | 100 |
| Possible travel distance (with heating) | | % | 50 | 50 | 84 | 84 | 84 | 84 | 84 | 84 | 84 | 84 |
| Boiling point | | ° C. | −26.1 | −29.5 | −55.4 | −48.0 | −55.2 | −46.0 | −55.4 | −54.8 | −53.5 | −52.8 |
| Heating method | | System | Electric heater | Electric heater | Heat pump | Heat pump | Heat pump | Heat pump | Heat pump | Heat pump | Heat pump | Heat pump |

TABLE 4

| Item | | Unit | Ex. 4 D1 | Comp. Ex. 7 D | Comp. Ex. 8 I | Ex. 5 I' | Ex. 6 J | Ex. 7 J' | Ex. 8 K | Ex. 9 L | Comp. Ex. 9 M | Ex. 10 M' |
|---|---|---|---|---|---|---|---|---|---|---|---|---|
| Proportion of formulations | E-HFO-1132 | mass % | 44.5 | 44.0 | 72.0 | 63.8 | 57.2 | 50.0 | 44.2 | 35.6 | 52.6 | 39.2 |
| | R32 | mass % | 2.2 | 0.0 | 0.0 | 5.0 | 10.0 | 16.7 | 23.4 | 36.8 | 0.0 | 5.0 |
| | R1234yf | mass % | 53.3 | 56.0 | 28.0 | 31.2 | 32.8 | 33.3 | 32.4 | 27.6 | 47.4 | 55.8 |
| | R134a | mass % | 0.0 | 0.0 | 0.0 | 0.0 | 0.0 | 0.0 | 0.0 | 0.0 | 0.0 | 0.0 |
| GWP(AR4) | | — | 17 | 3 | 2 | 36 | 69 | 115 | 160 | 250 | 2 | 36 |
| COP ratio (relative to R1234yf) | | % | 100 | 100 | 100 | 100 | 100 | 100 | 100 | 100 | 100 | 100 |
| Refrigerating capacity ratio(relative to R1234yf) | | % | 200 | 192 | 240 | 242 | 245 | 251 | 258 | 274 | 208 | 199 |
| Power consumption of driving force | | % | 100 | 100 | 100 | 100 | 100 | 100 | 100 | 100 | 100 | 100 |
| Power consumption for heating | | % | 33 | 33 | 33 | 33 | 33 | 33 | 33 | 33 | 33 | 33 |
| Possible travel distance (without heating) | | % | 100 | 100 | 100 | 100 | 100 | 100 | 100 | 100 | 100 | 100 |
| Possible travel distance (with heating) | | % | 84 | 84 | 84 | 84 | 84 | 84 | 84 | 84 | 84 | 84 |
| Boiling point | | ° C. | −49.1 | −48.3 | −51.2 | −51.8 | −52.3 | −52.7 | −53.1 | −53.5 | −49.4 | −49.3 |
| Heating method | | System | Heat pump | Heat pump | Heat pump | Heat pump | Heat pump | Heat pump | Heat pump | Heat pump | Heat pump | Heat pump |

TABLE 5

| Item | | Unit | Ex. 11 N | Ex. 12 N' | Ex. 13 O | Ex. 14 P | Ex. 15 G | Ex. 16 H | Ex. 17 E | Ex. 18 E' | Ex. 19 F |
|---|---|---|---|---|---|---|---|---|---|---|---|
| Proportion of formulations | E-HFO-1132 | mass % | 32.4 | 28.4 | 25.7 | 22.6 | 12.2 | 0.0 | 22.4 | 11.2 | 0.0 |
| | R32 | mass % | 10.0 | 16.7 | 23.4 | 36.8 | 0.0 | 8.2 | 0.0 | 7.4 | 15.6 |
| | R1234yf | mass % | 57.6 | 54.9 | 50.9 | 40.6 | 87.8 | 91.8 | 77.6 | 81.4 | 84.4 |
| | R134a | mass % | 0.0 | 0.0 | 0.0 | 0.0 | 0.0 | 0.0 | 0.0 | 0.0 | 0.0 |
| GWP(AR4) | | — | 70 | 115 | 160 | 250 | 4 | 59 | 3 | 53 | 109 |
| COP ratio (relative to R1234yf) | | % | 100 | 100 | 100 | 100 | 100 | 101 | 100 | 101 | 101 |
| Refrigerating capacity ratio(relative to R1234yf) | | % | 201 | 212 | 224 | 250 | 128 | 127 | 150 | 150 | 150 |
| Power consumption of driving force | | % | 100 | 100 | 100 | 100 | 100 | 100 | 100 | 100 | 100 |
| Power consumption for heating | | % | 33 | 33 | 33 | 33 | 33 | 33 | 33 | 33 | 33 |
| Possible travel distance (without heating) | | % | 100 | 100 | 100 | 100 | 100 | 100 | 100 | 100 | 100 |
| Possible travel distance (with heating) | | % | 84 | 84 | 84 | 84 | 84 | 84 | 84 | 84 | 84 |
| Boiling point | | ° C. | −19.8 | −50.6 | −51.2 | −52.1 | −40.0 | −40.0 | −44.0 | −44.6 | −43.8 |
| Heating method | | System | Heat pump | Heat pump | Heat pump | Heat pump | Heat pump | Heat pump | Heat pump | Heat pump | Heat pump |

TABLE 6

| Item | | Unit | Comp. Ex. 11 | Ex. 20 | Ex. 21 | Ex. 22 | Comp. Ex. 12 | Ex. 23 | Ex. 24 | Ex. 25 |
|---|---|---|---|---|---|---|---|---|---|---|
| Proportion of formulations | E-HFO-1132 | mass % | 5.0 | 5.0 | 5.0 | 5.0 | 5.0 | 15.0 | 15.0 | 15.0 |
| | R32 | mass % | 2.5 | 7.5 | 20.0 | 30.0 | 40.0 | 10.0 | 20.0 | 30.0 |
| | R1234yf | mass % | 92.5 | 87.5 | 75.0 | 65.0 | 55.0 | 75.0 | 65.0 | 55.0 |
| | R134a | mass % | 0.0 | 0.0 | 0.0 | 0.0 | 0.0 | 0.0 | 0.0 | 0.0 |
| GWP(AR4) | | — | 21 | 54 | 138 | 205 | 272 | 71 | 138 | 205 |
| COP ratio (relative to R1234yf) | | % | 100 | 101 | 101 | 101 | 101 | 101 | 101 | 101 |
| Refrigerating capacity ratio(relative to R1234yf) | | % | 120 | 136 | 174 | 199 | 222 | 166 | 194 | 219 |
| Power consumption of driving force | | % | 100 | 100 | 100 | 100 | 100 | 100 | 100 | 100 |
| Power consumption for heating | | % | 95 | 33 | 33 | 33 | 33 | 33 | 33 | 33 |
| Possible travel distance (without beating) | | % | 100 | 100 | 100 | 100 | 100 | 100 | 100 | 100 |
| Possible travel distance (with heating) | | % | 50 | 84 | 84 | 84 | 84 | 84 | 84 | 84 |
| Boiling point | | ° C. | −38.3 | −42.3 | −46.8 | −48.5 | −49.6 | −46.7 | −49.1 | −50.4 |
| Heating method | | System | Electric treater | Heat pump | Heat pump | Heat pump | Heat pump | Heat pump | Heat pump | Heat pump |

TABLE 7

| Item | | Unit | Comp. Ex. 13 | Ex. 26 | Ex. 27 | Ex. 28 | Comp. Ex. 14 | Ex. 29 | Ex. 30 | Ex. 31 |
|---|---|---|---|---|---|---|---|---|---|---|
| Proportion of formulations | E-HFO-1132 | mass % | 15.0 | 25.0 | 25.0 | 25.0 | 25.0 | 40.0 | 40.0 | 40.0 |
| | R32 | mass % | 40.0 | 10.0 | 20.0 | 30.0 | 40.0 | 10.0 | 2.0.0 | 30.0 |
| | R1234yf | mass % | 45.0 | 65.0 | 55.0 | 45.0 | 35.0 | 50.0 | 40.0 | 30.0 |
| | R134a | mass % | 0.0 | 0.0 | 0.0 | 0.0 | 0.0 | 0.0 | 0.0 | 0.0 |
| GWP(AR4) | | — | 272 | 70 | 137 | 205 | 272 | 70 | 137 | 204 |
| COP ratio (relative to R1234yf) | | % | 101 | 100 | 100 | 100 | 100 | 100 | 100 | 100 |
| Refrigerating capacity ratio(relative to R1234yf) | | % | 242 | 186 | 214 | 239 | 261 | 215 | 242 | 266 |
| Power consumption of driving force | | % | 100 | 100 | 100 | 100 | 100 | 100 | 100 | 100 |
| Power consumption for heating | | % | 33 | 33 | 33 | 33 | 33 | 33 | 33 | 33 |
| Possible travel distance (without heating) | | % | 100 | 100 | 100 | 100 | 100 | 100 | 100 | 100 |
| Possible travel distance (with heating) | | % | 84 | 84 | 84 | 84 | 84 | 84 | 84 | 84 |
| Boiling point | | ° C. | −51.3 | −48.7 | −50.6 | −51.8 | −52.6 | −50.7 | −52.3 | −53.3 |
| Heating method | | System | Heat pump | Heat pump | Heat pump | Heat pump | Heat pump | Heat pump | Heat pump | Heat pump |

TABLE 8

| Item | | Unit | Comp. Ex. 15 | Comp. Ex. 16 | Comp. Ex. 17 | Ex. 32 | Comp. Ex. 18 |
|---|---|---|---|---|---|---|---|
| Proportion of formulations | E-HFO-1132 | mass % | 40.0 | 50.0 | 50.0 | 50.0 | 50.0 |
| | R32 | mass % | 40.0 | 10.0 | 20.0 | 30.0 | 40.0 |
| | R1234yf | mass % | 20.0 | 40.0 | 30.0 | 20.0 | 10.0 |
| | R134a | mass % | 0.0 | 0.0 | 0.0 | 0.0 | 0.0 |
| GWP(AR4) | | — | 271 | 70 | 137 | 204 | 271 |
| COP ratio (relative to R1234yf) | | % | 100 | 100 | 100 | 100 | 100 |
| Refrigerating capacity ratio(relative to R1234yf) | | % | 288 | 233 | 259 | 283 | 304 |
| Power consumption of driving force | | % | 100 | 100 | 100 | 100 | 100 |
| Power consumption for heating | | % | 33 | 33 | 33 | 33 | 33 |
| Possible travel distance (without heating) | | % | 100 | 100 | 100 | 100 | 100 |
| Possible travel distance (with heating) | | % | 84 | 84 | 84 | 84 | 84 |
| Boiling point | | ° C. | −54.1 | −51.7 | −53.1 | −54.1 | −54.8 |
| Heating method | | System | Heat pump | Heat pump | Heat pump | Heat pump | Heat pump |
| Disproportionation reaction (3 MPa) | | | Non-explosion | Explosion | Explosion | Non-explosion | Non-explosion |

45

Coordinates on line segments JK, MN, NO, and EF were determined based on the least squares method as follows. Coordinates on M'D1 can be expressed by the same formula as the coordinates on MN listed in Table 9.

The results indicate that in the refrigerant of the present disclosure, when the mass % of HFO-1132(E), R32, and R1234yf based on their sum is respectively represented by x, y, and z, if coordinates (x,y,z) in a ternary composition

TABLE 9

| Item | J | J' | K | M | M' | N |
|---|---|---|---|---|---|---|
| E-HFO-1132 | 57.2 | 50.0 | 44.2 | 52.6 | 39.2 | 32.4 |
| R32 | 10.0 | 16.7 | 23.4 | 0.0 | 5.0 | 10.0 |
| R1234yf | 32.8 | 33.3 | 32.4 | 47.4 | 55.8 | 57.6 |
| x = E-HFO-1132 | | x | | | x | |
| R32 approximate expression | $0.01727x^2 - 2.7828x + 112.643$ | | | $0.01792x^2 - 2.019x + 56.594$ | | |
| R1234yf approximate expression | $-0.01727x^2 + 1.7828x - 12.643$ | | | $-0.01792x^2 + 1.019x + 43.406$ | | |

| Item | N | N' | O | E | E' | F |
|---|---|---|---|---|---|---|
| E-HFO-1132 | 32.4 | 28.4 | 25.7 | 22.4 | 11.2 | 0.0 |
| R32 | 10.0 | 16.7 | 23.4 | 0.0 | 7.4 | 15.6 |
| R1234yf | 57.6 | 54.9 | 50.9 | 77.6 | 81.4 | 84.4 |
| x = E-HFO-1132 | | x | | | x | |
| R32 approximate expression | $0.1204x^2 - 8.9935x + 175.03$ | | | $0.0032x^2 - 0.7679x + 15.6$ | | |
| R1234yf approximate expression | $-0.1204x^2 + 7.9935x - 75.03$ | | | $-0.0032x^2 - 0.2321x + 84.4$ | | | diagram in which the sum of HFO-1132(E), R32, and R1234yf is 100 mass % satisfy the following requirements, the disproportionation reaction does not occur at 3 MPa and 150° C., and the refrigerant has a boiling point of −40° C. or lower and a GWP of 250 or less.

<Requirement>

When the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by straight lines C1D, DG, GH, HB', and B'C1 that connect the following 5 points:

point C1 (52.0, 36.9, 11.1),
point D (44.0, 0.0, 56.0),
point G (12.2, 0.0, 87.8),
point H (0.0, 8.2, 91.8), and
point B' (0.0, 36.6, 63.4), or on the straight lines C1D and B'C1 (excluding points D and B').

In the refrigerant of the present disclosure, when the mass % of HFO-1132(E), R32, and R1234yf based on their sum is respectively represented by x, y, and z, if coordinates (x,y,z) in a ternary composition diagram in which the sum of HFO-1132(E), R32, and R1234yf is 100 mass % satisfy the following requirements, the disproportionation reaction does not occur at 3 MPa and 150° C., and the refrigerant has a boiling point of −40° C. or lower and a GWP of 160 or less.

<Requirement>

Coordinates (x,y,z) are within the range of a figure surrounded by straight lines C2D, DG, GH, HB, and BC2 that connect the following 5 points:

point C2 (49.1, 23.5, 27.4),
point D (44.0, 0.0, 56.0),
point G (12.2, 0.0, 87.8),
point H (0.0, 8.2, 91.8), and
point B (0.0, 23.3, 76.7), or on the straight lines C2D and BC2 (excluding points D and B).

In the refrigerant of the present disclosure, when the mass % of HFO-1132(E), R32, and R1234yf based on their sum is respectively represented by x, y, and z, it is also found that if coordinates (x,y,z) in a ternary composition diagram in which the sum of HFO-1132(E), R32, and R1234yf is 100 mass % satisfy the following requirements, the disproportionation reaction does not occur at 3 MPa and 150° C., and the refrigerant ensures a WCP nonflammability, a boiling point of −40° C. or lower, and a GWP of 250 or less.

<Requirement>

Coordinates (x,y,z) are within the range of a figure surrounded by line segments LK, KD2, D2D, DG, GH, HB', and B'L that connect the following 7 points:

point L (35.6, 36.8, 27.6),
point K (44.2, 23.4, 32.4),
point D2 (48.1, 18.7, 33.2),
point D (44.0, 0.0, 56.0),
point G (12.2, 0.0, 87.8),
point H (0.0, 8.2, 91.8), and
point B' (0.0, 36.6, 63.4), or on the line segments LK, KD2, D2D, and B'L (excluding points D and B');

the line segments LK, D2D, DG, GH, HB', and B'L are straight lines; and the coordinates (x,y,z) of points on the line segment KD2 are represented by (x, $0.01727x^2-2.7828x+112.643$, $-0.01727x^2+1.7828x-12.643$).

In the refrigerant of the present disclosure, when the mass % of HFO-1132(E), R32, and R1234yf based on their sum is respectively represented by x, y, and z, it is also found that if coordinates (x,y,z) in a ternary composition diagram in which the sum of HFO-1132(E), R32, and R1234yf is 100 mass % satisfy the following requirements, the disproportionation reaction does not occur at 3 MPa and 150° C., and the refrigerant ensures a WCCF nonflammability, a boiling point of −40° C. or lower, and a GWP of 250 or less.

<Requirement>

In the refrigerant, coordinates (x,y,z) are within the range of a figure surrounded by line segments PO, ON', N'N, NM', M'D1, D1D, DG, GH, HB', and B'P that connect the following 10 points:

point P (22.6, 36.8, 40.6),
point O (25.7, 23.4, 50.9,
point N' (28.4, 16.7, 54.9),
point N (32.4, 10.0, 57.6),
point M' (39.2, 5.0, 55.8),
point D1 (44.5, 2.2, 53.3),
point D (44.0, 0.0, 56.0),
point G (12.2, 0.0, 87.8),
point H (0.0, 8.2, 91.8), and
point B' (0.0, 36.6, 63.4), or on the line segments PO, ON', N'N, NM', M'D1, D1D, and B'P (excluding points D and B');

the line segments PO, D1D, DG, GH, HB', and B'P are straight lines;

the coordinates (x,y,z) of points on the line segments ON' and N'N are represented by (x, $0.1204x^2-8.9935x+175.03$, $-0.1204x^2+7.9935x-75.03$); and the coordinates (x,y,z) of points on the line segments NM' and M'D1 are represented by (x, $0.01792x^2-2.019x+56.594$, $-0.01792x^2+1.019x+43.406$).

In the refrigerant of the present disclosure, when the mass % of HFO-1132(E), R32, and R1234yf based on their sum is respectively represented by x, y, and z, it is also found that if coordinates (x,y,z) in a ternary composition diagram in which the sum of HFO-1132(E), R32, and R1234yf is 100 mass % satisfy the following requirements, the disproportionation reaction does not occur at 3 MPa and 150° C., and the refrigerant ensures a WCCF nonflammability, a refrigerating capacity (Cap) ratio of 150% or more relative to R1234yf, and a GWP of 250 or less.

<Requirement>

In the refrigerant, coordinates (x,y,z) are within the range of a figure surrounded by line segments PO, ON', N'N, NM', M'D1, D1D, DE, EE', E'F, FB', and B'P that connect the following 11 points:

point P (22.6, 36.8, 40.6),
point O (25.7, 23.4, 50.9,
point N' (28.4, 16.7, 54.9),
point N (32.4, 10.0, 57.6),
point M' (39.2, 5.0, 55.8),
point D1 (44.5, 2.2, 53.3),
point D (44.0, 0.0, 56.0),
point E (22.4, 0.0, 77.6),
point E' (11.2, 7.4, 81.4),
point F (0.0, 15.6, 84.4), and
point B' (0.0, 36.6, 63.4), or on the line segments PO, ON', N'N, NM', M'D1, D1D, EE', E'F, and B'P (excluding points D, E, and B');

the line segments PO, D1D, DE, FB', and B'P are straight lines;

the coordinates (x,y,z) of points on the line segments ON' and N'N are represented by (x, $0.1204x^2-8.9935x+175.03$, $-0.1204x^2+7.9935x-75.03$);

the coordinates (x,y,z) of points on the line segments NM' and M'D1 are represented by (x, $0.01792x^2-2.019x+56.594$, $-0.01792x^2+1.019x+43.406$); and the coordinates (x,y,z) of points on the line segments EE' and E'F are represented by (x, $0.0032x^2-0.7679x+15.6$, $-0.0032x^2-0.2321x+84.4$).

the coordinates (x,y,z) of points on the line segments NM' and M'D1 are represented by (x, $0.01792x^2-2.019x+56.594$, $-0.01792x^2+1.019x+43.406$); and the coordinates (x,y,z) of points on the line segments EE' and E'F are represented by (x, $0.0032x^2-0.7679x+15.6$, $-0.0032x^2-0.2321x+84.4$).

As shown in Table 10, it is also found that the refrigerant of the present disclosure exhibits the desired effect even when the refrigerant comprises a predetermined additional compound.

TABLE 10

| Item | | Unit | Comp. Ex. 1 | Ex. 33 | Ex. 34 | Ex. 35 | Ex. 36 | Ex. 37 | Ex. 38 |
|---|---|---|---|---|---|---|---|---|---|
| Proportion of formulations | E-HFO-1132 | mass % | 0.0 | 28.0 | 28.0 | 28.0 | 28.0 | 28.0 | 28.0 |
| | R32 | mass % | 0.0 | 21.5 | 21.5 | 21.5 | 21.5 | 21.5 | 21.5 |
| | R1234yf | mass % | 100.0 | 50.5 | 50.1 | 50.1 | 50.3 | 50.1 | 50.1 |
| | R134a | mass % | 0.0 | 0.0 | 0.0 | 0.0 | 0.0 | 0.0 | 0.0 |
| Additional trace refrigerant | HFO-1132a | mass % | 0.0 | 0.0 | 0.4 | 0.0 | 0.0 | 0.0 | 0.0 |
| | HFO-1123 | mass % | 0.0 | 0.0 | 0.0 | 0.4 | 0.0 | 0.0 | 0.0 |
| | R143a | mass % | 0.0 | 0.0 | 0.0 | 0.0 | 0.2 | 0.0 | 0.0 |
| | R134a | mass % | 0.0 | 0.0 | 0.0 | 0.0 | 0.0 | 0.4 | 0.0 |
| | R124 | mass % | 0.0 | 0.0 | 0.0 | 0.0 | 0.0 | 0.0 | 0.4 |
| | GWP(AR4) | | 4 | 147 | 147 | 147 | 156 | 153 | 150 |
| COP ratio (relative to R1234yf) | | | 100 | 100.1 | 100.0 | 100.1 | 100.1 | 100.2 | 100.1 |
| Refrigerating capacity ratio(relative to R1234yf) | | | 100 | 223.5 | 225.3 | 224.4 | 223.7 | 223.4 | 223.2 |
| Power consumption of driving force | | | 100 | 100 | 100 | 100 | 100 | 100 | 100 |
| Power consumption for heating | | | 100 | 33 | 33 | 33 | 33 | 33 | 33 |
| Possible travel distance (without heating) | | | 100 | 100 | 100 | 100 | 100 | 100 | 100 |
| Possible travel distance (with heating) | | | 50 | 84 | 84 | 84 | 84 | 84 | 84 |
| Boiling point | | | −29.5 | −51.2 | −52.0 | −51.3 | −51.2 | −51.2 | −51.2 |
| Heating method | | | Electric heater | Heat pump | Heat pump | Heat pump | Heat pump | Heat pump | Heat pump |

In the refrigerant of the present disclosure, when the mass % of HFO-1132(E), R32, and R1234yf based on their sum is respectively represented by x, y, and z, it is also found that if coordinates (x,y,z) in a ternary composition diagram in which the sum of HFO-1132(E), R32, and R1234yf is 100 mass % satisfy the following requirements, the disproportionation reaction does not occur at 3 MPa and 150° C., and the refrigerant ensures a WCCF nonflammability, a refrigerating capacity (Cap) ratio of 150% or more relative to R1234yf, and a GWP of 160 or less.
<Requirement>

In the refrigerant, coordinates (x,y,z) are within the range of a figure surrounded by line segments ON', N'N, NM', M'D1, D1D, DE, EE', E'F, FB, and BO that connect the following 10 points:
point O (25.7, 23.4, 50.9,
point N' (28.4, 16.7, 54.9),
point N (32.4, 10.0, 57.6),
point M' (39.2, 5.0, 55.8),
point D1 (44.5, 2.2, 53.3),
point D (44.0, 0.0, 56.0),
point E (22.4, 0.0, 77.6),
point E' (11.2, 7.4, 81.4),
point F (0.0, 15.6, 84.4), and
point B (0.0, 23.3, 76.7), or
on the line segments ON', N'N, NM', M'D1, D1D, EE', E'F, and BO (excluding points D, E, and B);

the line segments D1D, DE, FB, and BO are straight lines;

the coordinates (x,y,z) of points on the line segments ON' and N'N are represented by (x, $0.1204x^2-8.9935x+175.03$, $-0.1204x^2+7.9935x-75.03$);

Further, when the refrigerant of the present disclosure is subjected to a stability test under the following conditions, as shown in Table 11, it is found that the generation of solid matter is suppressed when the refrigerant comprises a predetermined proportion of water.
<Sample Preparation>

By adding a predetermined amount of water to the above 1,2-difluoroethylene, the content of water based on 1,2-difluoroethylene was adjusted to 10, 100, 1000, and 2000 mass ppm. 1,2-difluoroethylene with the water content adjusted as above was sealed in a container, and oxygen was blown into the container to make the amount of oxygen relative to 1,2-difluoroethylene adjusted to be as shown in Table 11 as a criterion. As described above, each of the fluoroethylene compositions shown in Table 11 was obtained with the moisture and oxygen content adjusted to the predetermined proportions.

Each of the fluoroethylene compositions shown in Table 11 was obtained with the oxygen content adjusted to a predetermined proportion in the same manner as in the previous example, except that no water or oxygen was added to the 1,2-difluoroethylene used in the previous example.
<Evaluation Method>
(Stability Test of Fluoroethylene)

Stability tests were conducted on each of the fluoroethylene compositions obtained in the above Examples and Comparative Examples as follows. To a glass tube (ID 8 mmφ×OD 12 mmφ×L 300 mm), one side of which had been melt-sealed, the fluoroethylene composition was added so that the content of 1, 2-difluoroethylene was 0.01 mol. The tube was sealed by melting. This tube was allowed to stand in a constant-temperature vessel under an atmosphere of 150° C. and kept in this state for one week. After that, the tube was taken out from the constant-temperature vessel and cooled, the appearance was checked, and the acid content in the gas inside the tube was analyzed to evaluate the stability of fluoroethylene.

In the stability test of fluoroethylene, the acid content of the gas was analyzed by the following method. In the cooled tube, the gas remaining in the tube was completely solidified by using liquid nitrogen. After that, the tube was opened and gradually thawed to recover the gas in the Tedlar bag. 5 g of pure water was injected into the Tedlar bag so as to extract the acid into pure water while making contact with the recovered gas well. The extract was detected by ion chromatography to measure the content (mass ppm) of a fluoride ion (F—).

point G (12.2, 0.0, 87.8),
point H (0.0, 8.2, 91.8), and
point B (0.0, 23.3, 76.7), or
on the above straight lines C2D and BC2 (excluding points D and B).
Item 3.
The composition according to Item 1, wherein in the refrigerant, coordinates (x,y,z) are within the range of a figure surrounded by line segments LK, KD2, D2D, DG, GH, HB', and B'L that connect the following 7 points:
point L (35.6, 36.8, 27.6),
point K (44.2, 23.4, 32.4),
point D2 (48.1, 18.7, 33.2),
point D (44.0, 0.0, 56.0),
point G (12.2, 0.0, 87.8),
point H (0.0, 8.2, 91.8), and
point B' (0.0, 36.6, 63.4), or

TABLE 11

| No. | Ex./Comp. Ex. | HFO-1132(E) (mass %) | R32 (mass %) | R1234yf (mass %) | Amount of water added (mass ppm) | Amount of oxygen added (mol %) | Acid content (mass ppm) | Appearance (confirmation of presence/absence of solid mailer) |
|-----|---------------|----------------------|--------------|------------------|----------------------------------|--------------------------------|-------------------------|----------------------------------------------------------------|
| 1 | Ref. Ex. 1 | 28.0 | 21.5 | 50.5 | 0(N.D.) | 0 | <1 | Absent |
| 2 | Ref. Ex. 2 | | | | 10 | 0 | <1 | Absent |
| 3 | Ref. Ex. 3 | | | | 100 | 0 | <1 | Absent |
| 4 | Ref. Ex. 4 | | | | 1000 | 0 | <1 | Absent |
| 5 | Ref. Ex. 5 | | | | 2000 | 0 | <1 | Present |
| 6 | Comp. Ex. 19 | | | | 0(N.D.) | 0.01 | 50 | Absent |
| 7 | Ex. 39 | | | | 10 | 0.01 | 25 | Absent |
| 8 | Ex. 40 | | | | 100 | 0.01 | 10 | Absent |
| 9 | Ex. 41 | | | | 1000 | 0.01 | <1 | Absent |
| 10 | Comp. Ex. 20 | | | | 2000 | 0.01 | <1 | Present |
| 11 | Comp. Ex. 21 | | | | 0(N.D.) | 0.1 | 150 | Absent |
| 12 | Ex. 42 | | | | 10 | 0.1 | 75 | Absent |
| 11 | Ex. 43 | | | | 100 | 0.1 | 50 | Absent |
| 12 | Ex. 44 | | | | 1000 | 0.1 | 30 | Absent |
| 13 | Comp. Ex. 22 | | | | 2000 | 0.1 | <1 | Present |

Item 1.
A composition comprising a refrigerant for use in operating air-conditioning equipment for vehicles,
the refrigerant comprising trans-1,2-difluoroethylene (HFO-1132(E)), difluoromethane (R32), and 2,3,3, 3-tetrafluoropropene (HFO-1234yf),
wherein
when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by straight lines C1D, DG, GH, HB', and B'C1 that connect the following 5 points:
point C1 (52.0, 36.9, 11.1),
point D (44.0, 0.0, 56.0),
point G (12.2, 0.0, 87.8),
point H (0.0, 8.2, 91.8), and
point B' (0.0, 36.6, 63.4), or
on the above straight lines C1D and B'C1 (excluding points D and B').
Item 2.
The composition according to Item 1, wherein in the refrigerant, coordinates (x,y,z) are within the range of a figure surrounded by straight lines C2D, DG, GH, HB, and BC2 that connect the following 5 points:
point C2 (49.1, 23.5, 27.4),
point D (44.0, 0.0, 56.0), on the above line segments LK, KD2, D2D, and B'L (excluding points D and B');
the above line segments LK, D2D, DG, GH, HB', and B'L are straight lines; and
the coordinates (x,y,z) of points on the above line segment KD2 are represented by (x, $0.01727x^2-2.7828x+112.643$, $-0.01727x^2+1.7828x-12.643$).
Item 4.
The composition according to Item 1, wherein in the refrigerant, coordinates (x,y,z) are within the range of a figure surrounded by line segments PO, ON', N'N, NM', M'D1, D1D, DG, GH, HB', and B'P that connect the following 10 points:
point P (22.6, 36.8, 40.6),
point O (25.7, 23.4, 50.9,
point N' (28.4, 16.7, 54.9),
point N (32.4, 10.0, 57.6),
point M' (39.2, 5.0, 55.8),
point D1 (44.5, 2.2, 53.3),
point D (44.0, 0.0, 56.0),
point G (12.2, 0.0, 87.8),
point H (0.0, 8.2, 91.8), and
point B' (0.0, 36.6, 63.4), or
on the above line segments PO, ON', N'N, NM', M'D1, DID, and B'P (excluding points D and B');
the above line segments PO, D1D, DG, GH, HB', and B'P are straight lines;
the coordinates (x,y,z) of points on the above line segments ON' and N'N are represented by (x, $0.1204x^2-8.9935x+175.03$, $-0.1204x^2+7.9935x-75.03$); and the coordinates (x,y,z) of points on the above line segments NM' and M'D1 are represented by (x, $0.01792x^2-2.019x+56.594$, $-0.01792x^2+1.019x+43.406$).

Item 5.

The composition according to Item 1, wherein in the refrigerant, coordinates (x,y,z) are within the range of a figure surrounded by line segments PO, ON', N'N, NM', M'D1, D1D, DE, EE', E'F, FB', and B'P that connect the following 11 points:

point P (22.6, 36.8, 40.6), point O (25.7, 23.4, 50.9, point N' (28.4, 16.7, 54.9), point N (32.4, 10.0, 57.6), point M' (39.2, 5.0, 55.8), point D1 (44.5, 2.2, 53.3), point D (44.0, 0.0, 56.0), point E (22.4, 0.0, 77.6), point E' (11.2, 7.4, 81.4), point F (0.0, 15.6, 84.4), and point B' (0.0, 36.6, 63.4), or on the above line segments PO, ON', N'N, NM', M'D1, D1D, EE', E'F, and B'P (excluding points D, E, and B');

the above line segments PO, D1D, DE, FB', and B'P are straight lines;

the coordinates (x,y,z) of points on the above line segments ON' and N'N are represented by (x, $0.1204x^2-8.9935x+175.03$, $-0.1204x^2+7.9935x-75.03$);

the coordinates (x,y,z) of points on the above line segments NM' and M'D1 are represented by (x, $0.01792x^2-2.019x+56.594$, $-0.01792x^2+1.019x+43.406$); and the coordinates (x,y,z) of points on the above line segments EE' and E'F are represented by (x, $0.0032x^2-0.7679x+15.6$, $-0.0032x^2-0.2321x+84.4$).

Item 6.

The composition according to Item 1, wherein in the refrigerant, coordinates (x,y,z) are within the range of a figure surrounded by line segments ON', N'N, NM', M'D1, D1D, DE, EE', E'F, FB, and BO that connect the following 10 points:

point O (25.7, 23.4, 50.9, point N' (28.4, 16.7, 54.9), point N (32.4, 10.0, 57.6), point M' (39.2, 5.0, 55.8), point D1 (44.5, 2.2, 53.3), point D (44.0, 0.0, 56.0), point E (22.4, 0.0, 77.6), point E' (11.2, 7.4, 81.4), point F (0.0, 15.6, 84.4), and point B (0.0, 23.3, 76.7), or on the above line segments ON', N'N, NM', M'D1, D1D, EE', E'F, and BO (excluding points D, E, and B);

the above line segments D1D, DE, FB, and BO are straight lines;

the coordinates (x,y,z) of points on the above line segments ON' and N'N are represented by (x, $0.1204x^2-8.9935x+175.03$, $-0.1204x^2+7.9935x-75.03$);

the coordinates (x,y,z) of points on the above line segments NM' and M'D1 are represented by (x, $0.01792x^2-2.019x+56.594$, $-0.01792x2+1.019x+43.406$); and the coordinates (x,y,z) of points on the above line segments EE' and E'F are represented by (x, $0.0032x^2-0.7679x+15.6$, $-0.0032x^2-0.2321x+84.4$).

Item 7.

The composition according to any one of Items 1 to 6, wherein the refrigerant further comprises at least one additional refrigerant selected from the group consisting of:

acetylene, HFO-1132a, HFO-1141, HFO-1123, HFC-143a, HFC-134a, Z-HFO-1132, HFO-1243zf, HFC-245cb, HCFC-1122, HCFC-124, CFC-1113, HFC-152a, HFC-161, and 3,3,3-trifluoropropyne.

Item 8.

The composition according to any one of Items 1 to 7, wherein the refrigerant further comprises 0.1% or less of water.

Item 9.

The composition according to any one of Items 1 to 8, wherein the total content of HFO-1132(E), R32, and HFO-1234yf is more than 99.5 mass %, based on the total of the refrigerant.

Item 10.

A composition comprising a refrigerant, the refrigerant further comprising:

HFO-1132(E), R32, and R1234yf; and at least one additional refrigerant selected from the group consisting of acetylene, HFO-1132a, HFO-1141, HFO-1123, HFC-143a, HFC-134a, Z-HFO-1132, HFO-1243zf, HFC-245cb, HCFC-1122, HCFC-124, CFC-1113, HFC-152a, HFC-161, and 3,3,3-trifluoropropyne.

Item 11.

A composition comprising a refrigerant, the refrigerant comprising HFO-1132(E), R32, R1234yf, and 0.1% or less of water.

Item 12.

A refrigeration method comprising the step of operating a refrigeration cycle using the composition according to any one of Items 1 to 11.

Item 13.

A refrigeration apparatus comprising the composition according to any one of Items 1 to 11 as a working fluid.

Item 14.

A composition comprising a refrigerant, the refrigerant comprising 28±0.5 mass %, 21.5±0.5 mass %, and 50.5±0.5 mass % of HFO-1132(E), R32, and HFO-1234yf, respectively, based on their sum.

Item 15.

A refrigeration apparatus comprising a composition as a working fluid, the composition comprising a refrigerant, wherein the refrigerant comprises 28±0.5 mass %, 21.5±0.5 mass %, and 50.5±0.5 mass % of HFO-1132(E), R32, and HFO-1234yf, respectively, based on their sum.

Item 16.

A refrigeration method comprising the step of operating a refrigeration cycle using a composition comprising a refrigerant, wherein the refrigerant comprises 28±0.5 mass %, 21.5±0.5 mass %, and 50.5±0.5 mass % of HFO-1132(E), R32, and HFO-1234yf, respectively, based on their sum.

DESCRIPTION OF REFERENCE NUMERALS

1: Sample cell

2: High-speed camera

3: Xenon lamp

4: Collimating lens

5: Collimating lens

6: Ring filter

The invention claimed is:

1. A composition comprising a refrigerant for use in operating air-conditioning equipment for vehicles, the refrigerant comprising trans-1,2-difluoroethylene (HFO-1132(E)), difluoromethane (R32), and 2,3,3,3-tetrafluoropropene (HFO-1234yf), wherein when the mass % of HFO-1132(E), R32, and R1234yf based on their sum is respectively represented by x, y, and z, coordinates (x,y,z) in a ternary composition diagram in which the sum of HFO-1132(E), R32, and R1234yf is 100 mass % are within the range of a figure surrounded by straight lines C1D, DG, GH, HB', and B'C1 that connect the following 5 points:

point C1 (52.0, 36.9, 11.1), point D (44.0, 0.0, 56.0), point G (12.2, 0.0, 87.8), point H (0.0, 8.2, 91.8), and point B' (0.0, 36.6, 63.4), or on the above straight lines C1D and B'C1 (excluding points D and B'), wherein the refrigerant further comprises at least one additional refrigerant selected from the group consisting of:

acetylene, HFO-1132a, HFO-1141, HFO-1123, Z-HFO-1132, HFO-1243zf, HFC-245cb, HCFC-1122, HCFC-124, CFC-1113, HFC-161, and 3,3,3-trifluoropropyne, wherein the total content of HFO-1132(E), R32, and HFO-1234yf is more than 99.5 mass %, based on the total of the refrigerant.

2. The composition according to claim 1, wherein in the refrigerant, coordinates (x,y,z) are within the range of a figure surrounded by straight lines C2D, DG, GH, HB, and BC2 that connect the following 5 points:

point C2 (49.1, 23.5, 27.4), point D (44.0, 0.0, 56.0), point G (12.2, 0.0, 87.8), point H (0.0, 8.2, 91.8), and point B (0.0, 23.3, 76.7), or on the above straight lines C2D and BC2 (excluding points D and B).

3. The composition according to claim 1, wherein in the refrigerant, coordinates (x,y,z) are within the range of a figure surrounded by line segments LK, KD2, D2D, DG, GH, HB', and B'L that connect the following 7 points:

point L (35.6, 36.8, 27.6), point K (44.2, 23.4, 32.4), point D2 (48.1, 18.7, 33.2), point D (44.0, 0.0, 56.0), point G (12.2, 0.0, 87.8), point H (0.0, 8.2, 91.8), and point B' (0.0, 36.6, 63.4), or on the above line segments LK, KD2, D2D, and B'L (excluding points D and B');

the above line segments LK, D2D, DG, GH, HB', and B'L are straight lines; and the coordinates (x,y,z) of points on the above line segment KD2 are represented by (x, $0.01727x^2-2.7828x+112.643,-0.01727x^2+1.7828x-12.643$).

4. The composition according to claim 1, wherein in the refrigerant, coordinates (x,y,z) are within the range of a figure surrounded by line segments PO, ON', N'N, NM', M'D1, D1D, DG, GH, HB', and B'P that connect the following 10 points:

point P (22.6, 36.8, 40.6), point O (25.7, 23.4, 50.9, point N' (28.4, 16.7, 54.9), point N (32.4, 10.0, 57.6), point M' (39.2, 5.0, 55.8), point D1 (44.5, 2.2, 53.3), point D (44.0, 0.0, 56.0), point G (12.2, 0.0, 87.8), point H (0.0, 8.2, 91.8), and point B' (0.0, 36.6, 63.4), or on the above line segments PO, ON', N'N, NM', M'D1, D1D, and B'P (excluding points D and B');

the above line segments PO, D1D, DG, GH, HB', and B'P are straight lines;

the coordinates (x,y,z) of points on the above line segments ON' and N'N are represented by (x, $0.1204x^2-8.9935x+175.03$, $-0.1204x^2+7.9935x-75.03$); and the coordinates (x,y,z) of points on the above line segments NM' and M'D1 are represented by (x, $0.01792x^2-2.019x+56.594,-0.01792x^2+1.019x+43.406$).

5. The composition according to claim 1, wherein in the refrigerant, coordinates (x,y,z) are within the range of a figure surrounded by line segments PO, ON', N'N, NM', M'D1, D1D, DE, EE', E'F, FB', and B'P that connect the following 11 points:

point P (22.6, 36.8, 40.6), point O (25.7, 23.4, 50.9, point N' (28.4, 16.7, 54.9), point N (32.4, 10.0, 57.6), point M' (39.2, 5.0, 55.8), point D1 (44.5, 2.2, 53.3), point D (44.0, 0.0, 56.0), point E (22.4, 0.0, 77.6), point E' (11.2, 7.4, 81.4), point F (0.0, 15.6, 84.4), and point B' (0.0, 36.6, 63.4), or on the above line segments PO, ON', N'N, NM', M'DI, DID, EE', E'F, and B'P (excluding points D, E, and B');

the above line segments PO, D1D, DE, FB', and B'P are straight lines;

the coordinates (x,y,z) of points on the above line segments ON' and N'N are represented by (x, $0.1204x^2-8.9935x+175.03,-0.1204x^2+7.9935x-75.03$);

the coordinates (x,y,z) of points on the above line segments NM' and M'D1 are represented by (x, $0.01792x^2-2.019x+56.594,-0.01792x^2+1.019x+43.406$); and the coordinates (x,y,z) of points on the above line segments EE' and E'F are represented by (x, $0.0032x^2-0.7679x+15.6,-0.0032x^2-0.2321x+84.4$).

6. The composition according to claim 1, wherein in the refrigerant, coordinates (x,y,z) are within the range of a figure surrounded by line segments ON', N'N, NM', M'D1, D1D, DE, EE', E'F, FB, and BO that connect the following 10 points:

point O (25.7, 23.4, 50.9), point N' (28.4, 16.7, 54.9), point N (32.4, 10.0, 57.6), point M' (39.2, 5.0, 55.8), point D1 (44.5, 2.2, 53.3), point D (44.0, 0.0, 56.0), point E (22.4, 0.0, 77.6), point E' (11.2, 7.4, 81.4), point F (0.0, 15.6, 84.4), and point B (0.0, 23.3, 76.7), or on the above line segments ON', N'N, NM', M'D1, D1D, EE', E'F, and BO (excluding points D, E, and B);

the above line segments D1D, DE, FB, and BO are straight lines;

the coordinates (x,y,z) of points on the above line segments ON' and N'N are represented by (x, $0.1204x^2-8.9935x+175.03,-0.1204x^2+7.9935x-75.03$);

the coordinates (x,y,z) of points on the above line segments NM' and M'D1 are represented by (x, $0.01792x^2-2.019x+56.594, -0.01792x^2+1.019x+43.406$); and the coordinates (x,y,z) of points on the above line segments EE' and E'F are represented by (x, $0.0032x^2-0.7679x+15.6, -0.0032x^2-0.2321x+84.4$).

7. The composition according to claim 1, wherein the composition further comprises water, wherein water is present in a content ratio of 0.1% or less based on the composition.

8. A refrigeration method comprising the step of operating a refrigeration cycle using the composition according to claim 1.

9. A refrigeration apparatus comprising the composition according to claim 1 as a working fluid.

10. A composition comprising a refrigerant, the refrigerant comprising 28±0.5 mass %, 21.5±0.5 mass %, and 50.5±0.5 mass % of HFO-1132(E), R32, and HFO-1234yf, respectively, based on their sum, wherein the refrigerant further comprises at least one additional refrigerant selected from the group consisting of:

acetylene, HFO-1132a, HFO-1141, HFO-1123, Z-HFO-1132, HFO-1243zf, HFC-245cb, HCFC-1122, HCFC-124, CFC-1113, HFC-161, and 3,3,3-trifluoropropyne, wherein the total content of HFO-1132(E), R32, and HFO-1234yf is more than 99.5 mass %, based on the total of the refrigerant.

\* \* \* \* \*